INVENTORS
IAN A. WATSON
BY DEREK MARSHALL
ATTORNEYS

FIG. 1(b)

though they be of different sizes are equal, for the reasons outlined above, although the tailless airplanes, they are still not complete. The presently known monitoring systems permit the test of individual components of the system or to isolate individual components which have failed.

United States Patent Office 3,512,061
Patented May 12, 1970

3,512,061
MONITORING CONTROL FOR AN AIRCRAFT LANDING SYSTEM INCLUDING PLURAL COMPARITORS TO TEST OR ISOLATE INDIVIDUAL COMPONENTS
Ian A. Watson and Derek Marshall, Lewisham, London, England, assignors to Elliott Brothers (London) Limited, London, England, a British company
Filed Jan. 30, 1967, Ser. No. 612,535
Claims priority, application Great Britain, Jan. 29, 1966, 4,058/66, 4,060/66
Int. Cl. G05b 23/02
U.S. Cl. 318—18                3 Claims

ABSTRACT OF THE DISCLOSURE

An aircraft monitoring control for a landing system including a main control channel and a substantially duplicate monitoring channel. At various points in the system, a plurality of comparators are included which function in the conventional manner. A further feature of the use of plural comparators is the ability to test individual components of the system or to isolate individual components which have failed.

---

Figure 1A:
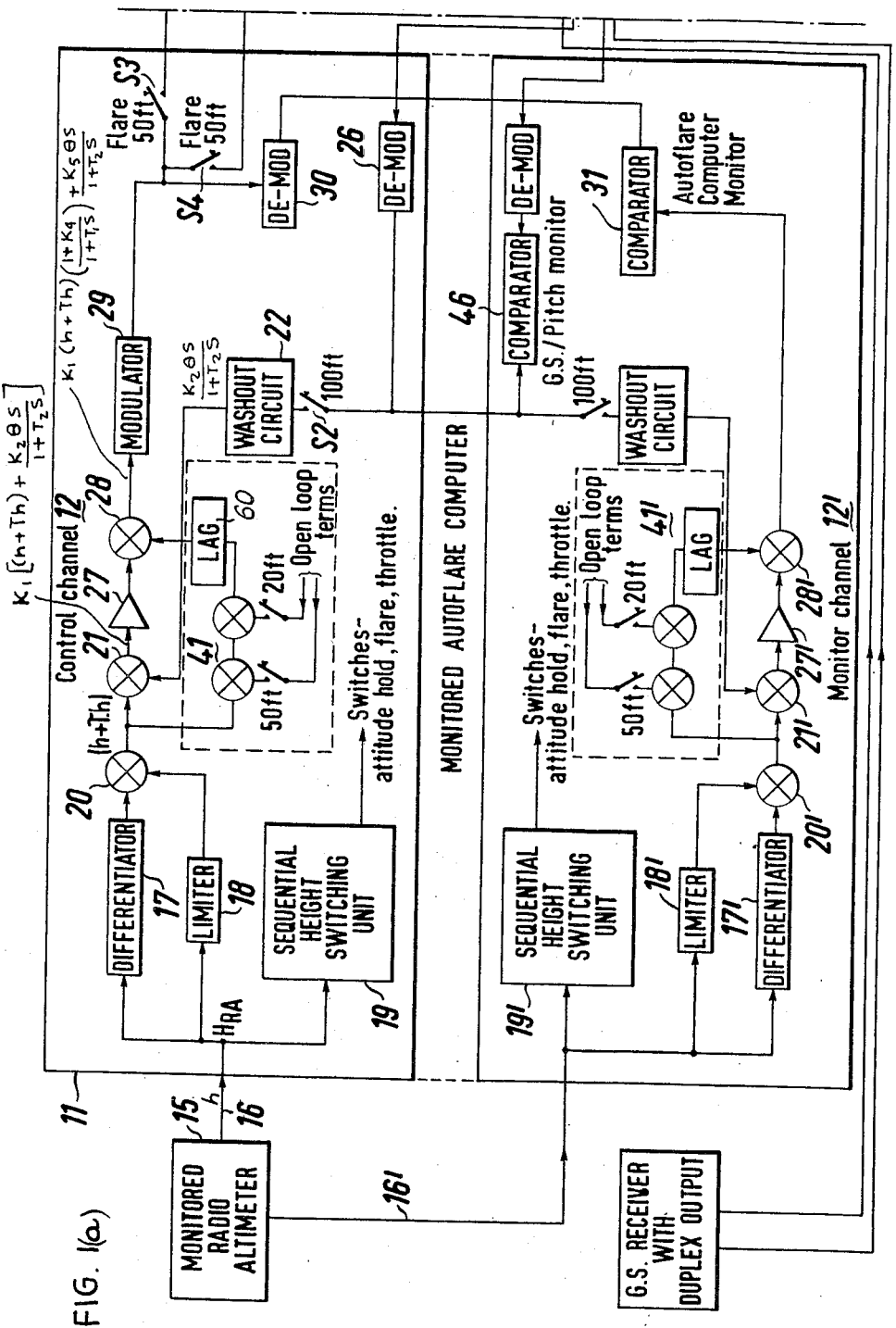

The present invention relates to a monitored aircraft control system producing a control signal from components signals of different aircraft flight parameters and/or signals derived therefrom, of the kind employing two channels one of which, a control channel, produces an output signal constituting the control signal and the other of which, a monitor channel, produces from the same input signals as are received by the control channel, an output signal which is compared in comparator means with the control signal, for monitoring purposes. Hereinafter a monitored control system of the above kind will be referred to as a monitored control system of the kind defined.

It is an object of the present invention to provide a monitored control system of the kind defined which in addition to providing normal monitored control of the aircraft, also enables a failure occurring in the system during such use, subsequently to be located.

It is also an object of the present invention to provide such a monitored control system in which there is an optimisation of choice between reducing the amount of equipment employed in locating a fault on the one hand and lessening the length of the testing procedure in fault location on the other hand.

The present invention provides a monitored control system of the kind defined, wherein the control channel and the monitor channel are constituted and the comparator means arranged so that after a failure has occurred in the system, the comparator means can be used severally in test parts of the two channels giving rise to different components of the respective output signals by means of feeding input signals to said parts, and thereby determine in which, if any, of the parts, a failure has occurred.

According to one feature of the present invention, the comparator means are employed together with switch means so that in respect of each channel the parts to be tested are tested part-sequentially and part-simultaneously. In this manner, the amount of equipment needed for entire simultaneous testing of the parts in each channel is reduced and the length of the testing procedure required by entire sequential testing is lessened.

In one embodiment of the present invention which is of particular use in the flare phase of landing, the control signal comprises a signal of two components one of which is a height rate demand signal. In this embodiment, the system provides (1) a radio altimeter producing duplex outputs, (2) in each channel, a differentiator receiving one of the outputs of the radio altimeter, a summing point receiving as one input, the output of the differentiator and as a further input, the other component of the channel output signal and switch means for disconnecting the latter input from the summing point; and (3) a comparator (hereinafter referred to as the first comparator) arranged so that by operation of the switch means, the outputs of the two summing points respectively of the two channels can be compared, (a) when the output of each summing point is produced solely from the output of the differentiator and (b) when the output of each summing point is produced from both the inputs thereto.

The other component of the control signal will be constituted according to the use or uses the control system is to serve i.e. according to whether the system is being used in landing and/or in take-off but in the case when the system is used over the flare phase of landing, the other component is preferably a signal derived from pitch attitude.

In a further embodiment of the present invention, which is also of use in landing of the aircraft, a signal representing the pitch attitude of the aircraft over the glide slope is contributed commencing at the start of the flare phase to the control signal together with a signal representing instantaneous pitch attitude; and for the purpose of producing these signals and of monitoring and testing the parts giving rise thereto, the system of the embodiment provides (1) a glide slope receiver (hereinafter referred to as a C.S. receiver) providing duplex outputs, (2) in each channel, a limiter receiving one of the outputs of the C.S. receiver, a desensitisation means receiving the output of the limiter, switch means and a vertical gyroscope for producing the signal representing instantaneous pitch attitute; and (3) a comparator (hereinafter called the further comparator, being one other than the first comparator); the switch means being operable to connect the further comparator to compare either the respective outputs of the two desensitisation means or the respective outputs of the two vertical gyroscopes. The pitch attitude signal derived from slide slope data is produced by an integrator provided in the control channel to integrate the output of the desensitisation means, the integrator being provided with means to store the signal produced by the integration, until initiation of the flare phase. For the purpose of monitoring and testing of the integrator and storage means, a tachogenerator may be provided to reproduce from the storage means, the output from the desensitisation means and the switch means constituted so that by operation of the latter, the output of the tachogenerator of the control channel can be compared with the output of the desensitisation means in the monitor channel. The control signal produced in this embodiment may comprise a further component signal representing another flight parameter and the further component signal may be summed with a signal derived from the vertical gyroscope. The above two embodiments may be combined and in the system thus produced the height rate demand signal of the first embodiment may be used to constitute the further component signal mentioned above and the other component of the first embodiment may be constituted by the signal derived from the vertical gyroscope of the second embodiment.

It will be seen that in the combined embodiments, the two comparators may be connected simultaneously to some of the parts of the system in each channel in one setting of their associated switching means and then connected to other parts of the system in each channel in another setting of their associated switching means so that the testing procedure in respect of the parts of each channel is part-sequential and part-simultaneous. It is, of course, understood that like parts of the two channels are monitored and tested together.

It will also be understood that although the comparators above mentioned are useful for fault location, they also serve during use of the system in controlling the flight of the aircraft, to indicate the occurrence of a fault and that since usually control systems are multiplexed the comparators can be used to actuate a switch device in the event of failure to switch from the failed channels to fresh channels of the system.

The foregoing and further features of the invention will become apparent from the following description of a preferred embodiment thereof with reference to the accompanying drawings which is a block schematic representation of a monitored arrangement for controlling the elevators of an aircraft.

Referring now to the drawing the arrangement comprises a monitored computer 11 consisting of a control channel 12 and a similar monitor channel 12', a longitudinal computer 13 and a similar comparison monitor 14.

A monitored radio altimeter 15 has an output connected via lead 16 to the inputs of a differentiator 17, a limiter 18 and a sequential height switching unit 19. The outputs from differentiator 17 and limiter 18 are fed as inputs so a summing point 20 whose output is connected as an input to a further summing point 21.

A further input to the summing point 21 is connected from the output of a washout circuit 22. The input to washout circuit 22 is derived from a vertical gyroscope 23 via lead 24, amplifier 25, switch S1, demodulator 26 and switch S2.

The output from demodulator 26 is also connected to one input of a comparator 46 in monitor channel 12'.

The output of summing point 21 is connected via an amplifier 27 and a summing point 28 to the input of a modulator 29. The output from the modulator 29 is connected: to one side of a switch S3; via a switch S4 to comparison monitor 14, and via a demodulator 30 to a comparator 32 in monitor channel 12'.

The other side of the switch S3 is connected as one input to a summing point 32 which derives further inputs from the vertical gyroscope 25 via lead 24 and from a full time command modifier 33. The full time command modifier 33 has its input connected to the output of a summing point 47. One input for the summing point 47 is derived from a glide slope receiver 48 via lead 49, a modulator limiter 50, a de-sensitisation arrangement 51 and an integrator 52. The output of the de-sensitisation arrangement 51 is connected, either directly or as derived from a tachometer which forms part of integrator 52 as selected by switch S5, to the switch S1.

The output from summing point 32 is fed as an input to a summing point 34 which derives a further input from a pitch rate gyroscope 35.

The output from summing point 34 is fed via a summing point 36 and an amplifier 37 to a power control unit 38 which is mechanically linked to control the position of elevators 39 (one only shown). Feedback circuits are provided from the power control unit 38 and from a pick off 40, associated with the mechanical linkage to elevators 39, the feedback circuits being connected to provide further inputs to the summing points 36.

An arrangement 41 in control channel 12 which derives an input from the output of summing point 20 and provides a further input for summing point 28 provides predetermined pitch up signals at predetermined altitudes of an aircraft carrying the apparatus under control of the sequential height switching unit 19. Such an arrangement is more fully disclosed and described in application Ser. No. 404,583, filed Oct. 19, 1964 and now abandoned. The problem during landing phase of the aircraft is to provide a high forward loop gain without loss of stability in the control of the aircraft. With low values of forward loop gain there is no stability problem but the system is too sluggish accurately to follow the desired flight path during the landing phase. Below 100 feet, the switch S1 is in the position shown so that the output of the washout circuit 22 is $$\frac{K_2 \theta S}{1 + T_2 S}$$

the transfer function of the washout circuit 22 being of the general form $$\frac{S}{1+S}$$

as is conventional for this type of circuit. The signal output from summing point 20 is $h + T\dot{h}$ where $h$ is the height output of the radio altimeter 15, $\dot{h}$ is the first derivative of $h$, and T is a constant. The above two signals are combined at the summing point 21 to produce the output $$K_1 \left[ (h + T\dot{h}) + \frac{K_2 \theta S}{1 + T_2 S} \right]$$

after suitable amplification, and to this signal is added the lagged form of the signal $h + T\dot{h}$ as obtained from the circuit 41. The circuit 41 includes a lag circuit 60 whose transfer function is of the general form $$\frac{1}{1+S}$$

as is conventional for this type of circuit. Thus, the combined signal output of the summing point 28 is of the form $$K_1 \left[ (h + T\dot{h}) + \frac{K_2 \theta S}{1 + T_2 S} \right] + \frac{K_3 (h + T\dot{h})}{1 + T_1 S}$$

which may be reduced to the form $$K_1 (h + T\dot{h}) \left( \frac{1 + K_4}{1 + T_1 S} \right) + \frac{K_5 \theta S}{1 + T_2 S}$$

T, $T_1$, $T_2$ and $K_1$, $K_4$ and $K_5$ being constants. In the above notations, the term $\theta$ is of course the output of the vertical gyro 23. By providing the washed-out pitch attitude signal, high forward loop gain may be utilized without inordinant dynamic instability. The term $K_1$ representing the desired high gain.

The portions in monitor channel 12' and comparison monitor 14 which corresponds in operation to similar portions in control channel 12 and longitudinal computer 13 respectively have been given corresponding references shown dashed.

In operation, during landing of the aircraft, whilst the aircraft is above an altitude of 100 feet i.e. in the glide slope mode of operation, an output from the glide slope receiver 48 is fed via lead 49, modulator limiter 50 and de-sensitisation arrangement 51 to store a signal representative of average glide slope in integrator 52. The output from the de-sensitisation arrangement 51 is fed via switch S5, switch S1 and demodulator 26 to one input of a comparator 46 in monitor channel 12. A further similar signal is fed from comparison monitor 14 via switch S1' and demodulator 26' in monitor channel 12' as the other input to comparator 46. Hence during the glide slope mode of operation of the arrangement when the aircraft is above 100 feet the comparator 46 is arranged to compare signals representative of glide slope. During this mode of operation switches S3 and S4 are open and, therefore, no signals pass from modulator 29 to summing point 32 in computer 13 or to the comparison monitor 14.

Signals representative of the height of the aircraft are fed from the monitored radio altimeter via lead 16 to the differentiator 17 the output from which is arranged to be a function of the height rate of the aircraft which is fed to the summing point 20. Providing the aircraft is descending at a steady rate, which would be the case during landing, a steady output signal is passed from differentiator 17 to the input of summing point 20. The output from the monitored radio altimeter 15 is also fed via the lead 16 to the input of the limiter 18. The limiter 18 is arranged, whilst the aircraft is above a height of 100 feet (or say 75 feet) to provide a steady output signal representative of 100 feet. Hence a steady output signal is fed from the limiter 18 to the input of summing point 20.

The output from summing point 20, which is also a steady signal, is fed via the summing point 21 and amplifier 27 to the summing point 28. The other connections to the summing points 21 and 28 do not provide inputs thereto whilst the aircraft is above 100 feet. The steady output from summing point 28 is fed via modulator 29 and demodulator 30 to one input of the comparator 31 in monitor channel 12'.

The operation of monitor channel 12' is identical to that as described above for control channel 12 except that there is no provision of a modulator 29 or demodulator 30 in the monitor channel 12'.

Hence it will be seen that the comparator 31 in monitor channel 12' is provided with two inputs each of which are relatively steady state signals. Thus providing the arrangement is functioning satisfactorily these two inputs to the comparator 31 will be less than the comparator threshold.

When the aircraft reaches 100 feet the output from limiter 18 becomes representative of the actual height of the aircraft in response to the input signal thereto from the monitored radio altimeter 15 representative of this actual height. Hence the output from summing point 20 is a height rate demand signal and this height rate demand signal is fed as an input to summing point 21 where it is augmented with a signal representative of washed out pitch attitude produced from washout circuit 22 on closure of switch S2 at 100 feet, and the demand signal thus augmented is compared with the analogous signal from monitor channel 12' in comparator 31. The output from washout circuit 22 is only provided when the aircraft is below 100 feet, this being arranged under control of sequential height switching unit 19 which causes switches S1 and S2 to change over from the positions shown in the figure, to provide an input to washout circuit 22, when the aircraft reaches 100 feet during a landing manoeuvre. The switch S1 when changing over in addition to causing signals representative of pitch attitude to be fed via demodulator 26 to the washout circuit 22 also allows such signals to pass to the input of comparator 46. Similar signals are derived from comparison monitor 14 via the demodulator 26' in monitor channel 12' are fed as the other input to comparator 46. Hence the comparator 46 is now arranged to compare signals representative of pitch attitude of the aircraft.

The operation of monitor channel 12' is identical to that of control channel 12 thus far described except that modulator 29 and demodulator 30 of control channel 12 are omitted in monitor channel 12'. Hence it will be seen that if the whole arrangement functions satisfactorily during the different modes of operation the pairs of inputs to comparators 31 and 46 in monitor channel 12' will be less than the comparator threshold.

When the aircraft reaches an altitude of 50 feet switches S3 and S4 are caused to change over from the positions shown in the drawing under control of sequential height switching unit 19. Hence the output signal from modulator 29 is fed to the summing point 32 where it is further augmented by a signal representative of pitch attitude derived from the vertical gyroscope 23 and a signal representative of stored pitch attitude at the end of the glide slope mode of operation derived from integrator 52 via summing point 47, and airspeed error limited by full time command modifier 33. The arrangement that provides the input to full time command modifier 33 representative of airspeed error is disclosed in application Ser. No. 612,536, filed Jan. 30, 1967.

The output from summing point 32 is fed to the summing point 34 where a further signal representative of pitch rate derived from pitch rate gyroscope 35 is further added. The output from summing point 34 which comprises the elevator demand signal is fed via summing point 36 and amplifier 37 to activate power control unit 38 to control the position of elevators 39.

Further monitoring, in this case of the control signal per se, is provided by a comparator 44 as disclosed in application Ser. No. 612,637, filed Jan. 30, 1967.

Should any of the comparators determine substantial inequality of the signals being compared the arrangement as shown is caused to relinquish control of the aircraft and a further identical arrangement is caused to take over such control. A suitable arrangement for controlling such change over is disclosed in our co-pending United Kingdom Pat. application No. 23,831/65.

A suitable arrangement for controlling the throttles of the aircraft and linked with the arrangement shown is disclosed in application Ser. No. 556,458, filed June 6, 1966.

Although the arrangement is merely shown for controlling the elevators of an aircraft it should be appreciated that the control signal produced could alternatively, or in addition, be utilised for providing a display in a flight director system or a flight monitor, i.e. a situation display.

It should be noted that in the arrangement shown a single comparator is utilised for performing two separate monitoring functions i.e. of glide slope and pitch during different modes of operation of the arrangement thus providing a saving of equipment.

In testing of the system three sequential phases may be used in which the parts of the system are operated in the manner as described above in the three modes of operation i.e. the glide slope mode, attitude hold mode and flare mode, by feeding appropriate input signals into the system. In addition, however, in a fourth phase, the tachogenerator output is tested by comparison with the output of the desensitisation means of the monitor channel 14'. In this manner by observing the outputs of the comparators 31, 44 and 46, it can be deduced whether or not a failure has occurred in a particular circuit component or in any one or more of several circuit components in either or both of the control channel and monitor channel as follows:

(1) One or more of—the differentiator (17, 17'); the limiter (18, 18'); the summing point (20, 20'); amplifier (27, 27'); summing point—(28, 28'); modulator 29 (control channel only); demodulator 30 (control channel only) and the comparator 31

(2) One or both of—the modulator limiter (50, 50'); desensitisation means (51, 51')

(3) Switch S5 (control channel only)

(4) One or both of—the vertical gyroscopes (23, 23') and amplifier (25, 25')

(5) One or more of—switch S1 (both channels); demodulator (26, 26') and comparator 46

(6) One or both of—washout circuit (22, 22'); and summing point (21, 21')

(7) One or both of—integrator 52 and the tachogenerator (8) One or more of—the components of the remaining parts of the system.

We claim:

1. In a control system for aircraft, the control system being of the type including actuator mechanism responsive to signal inputs thereto for controlling the aircraft, the improvement comprising:

a control channel and a monitor channel, each having an output signal and the output signal of the control channel being connected to said actuator mechanism for controlling the aircraft, said channels being substantially identical and each channel including a plurality of parts producing components of the respective output signals thereof, comparator means common to said channels, and switching means for selectively connecting said parts of said channel therewithin to delete and add the signal components thereof to said output signals of the channels, said switching means also being effective to connect different combinations of said signal components to said comparator means, whereby the comparator means may be used selectively to test parts of the two channels giving rise to said components of the respective output signals thereof.

2. In the control system as defined in claim 1 including an altimeter have duplex outputs connected to said channels, said switching means being controlled by said altimeter.

3. In the control system as defined in claim 2 wherein one of said parts in each channel is a differentiator connected to said altimeter and having an output proportional to the derivative of the altimeter output with respect to time, said comparator means comprising a first comparator continuously connected to the signal outputs of said differentiators and a second comparator, a second part of each channel comprising a vertical gyro having its signal component connected continuously to the respective channel output, a third part of each channel comprising an integrator, a glide slope receiver having duplex outputs connected to said integrators, the signal components of said vertical gyros being connected to said second comparator in one position of said switch means while said first comparator is connected only to the signal components of said differentiators and the signal components of said differentiators plus the signal components of said integrators being connected to said first comparator in another position of said switching means while the signal components of said integrators only are connected to said second comparator.

References Cited

UNITED STATES PATENTS

| | | |
|---|---|---|
| 2,704,647 | 3/1955 | Meyers et al. |
| 2,973,927 | 3/1961 | Miller et al. |
| 3,135,485 | 6/1964 | Miller. |
| 3,252,675 | 4/1966 | Close et al. |
| 3,395,615 | 8/1968 | Taylor. |

THOMAS E. LYNCH, Primary Examiner

U.S. Cl. X.R.

318—489; 244—77